Patented Apr. 7, 1925.

1,532,651

UNITED STATES PATENT OFFICE.

BRUCE KEITH BROWN, OF TERRE HAUTE, INDIANA, ASSIGNOR TO COMMERCIAL SOLVENTS CORPORATION, OF TERRE HAUTE, INDIANA, A CORPORATION OF MARYLAND.

MANUFACTURE OF RUBBER GOODS.

No Drawing.   Application filed June 13, 1924. Serial No. 719,845.

*To all whom it may concern:*

Be it known that I, BRUCE KEITH BROWN, a citizen of the United States, and resident of Terre Haute, in the county of Vigo and State of Indiana, have invented certain new and useful Improvements in the Manufacture of Rubber Goods, of which the following is a specification.

My invention relates to an improvement in the manufacture of rubber compositions such as rubber tubing, sheeting, cement, moulded articles, dipped goods, and coated goods; wherein the tensile strength, elasticity, and durability of the rubber is of great importance.

I have discovered that the addition of from one half per cent to five per cent of parabutyraldehyde to rubber compounds before vulcanization imparts increased tensile strength and elasticity to the finished products and makes them more durable for use or exposure to heat.

The compound, parabutyraldehyde, is a clear odorless liquid with a specific gravity of 0.917 at 21° C. It boils at 210–220° C. with decomposition to form n-butyraldehyde but an equilibrium is set up between the parabutyraldehyde and the aldehyde so that the decomposition is not at all complete. In the presence of acid a similar decomposition occurs far below the boiling point.

The beneficial effect on rubber compositions which I have discovered is imparted by the addition of parabutyraldehyde is probably due to its partial decomposition under vulcanization conditions, whereby condensations occur between the liberated aldehyde and the rubber. In this manner the equilibrium ordinarily present in mixtures of parabutyraldehyde and n-butyraldehyde is destroyed and the elimination of the aldehyde initially present, by its condensation with rubber, allows the decomposition to become complete.

In the past, acetaldehyde, propyl aldehyde and butyraldehyde have been used as constituents of rubber solutions to improve the qualities of rubber cements. The use of compounds of this type is necessarily confined to rubber solutions and dipped goods to be vulcanized by cold processes, as the volatility of the aldehydes prevents their use in the presence of heat. In addition to these disadvantages, the use of the aliphatic aldehydes in rubber compounding is inherently objectionable owing to the unpleasant odors evolved and the large losses caused by evaporation owing to the volatility of the compounds.

In accordance with my improved process for increasing the tensile strength, elasticity, and durability of rubber compositions, small quantities of parabutyraldehyde are added to rubber solutions to be used for dipped goods, coated goods, or cements; or to solid rubber mixes to be used for the production of sheets of rubber or moulded articles.

When additions are made to rubber solutions no especial plan need be followed as parabutyraldehyde is completely miscible in ordinary rubber solvents. When parabutyraldehyde is added to mixtures of rubber, fillers, and accelerators, from which sheets or moulded articles are to be prepared, the addition may be made after the rubber has been rendered plastic on the milling rolls and may be accomplished by sprinkling the parabutyraldehyde on the crude sheet and working it into the mass in the usual manner.

After the rubber articles are fabricated, they may be vulcanized in the usual manner, either by cold processes or by hot vulcanization by means of steam or heat and pressure. In the case of cold process vulcanization, the decomposition and condensation reactions before mentioned are apparently stimulated by the vulcanization reagents, but are completed less rapidly than when vulcanization is accomplished in part by means of heat. Good results are nevertheless obtained.

While I have described the percentage of parabutyraldehyde suitable to compound with rubber as from one half to five per cent it is of course understood that larger quantities may be used if desired. The maximum amount that may be added with good results varies with the type of rubber and other ingredients that are used.

Now, having described my invention, I claim the following as new and novel:—

1. A method for the manufacture of rubber goods which consists in adding a small quantity of parabutyraldehyde to a rubber mix, fabricating an article from said mix, and vulcanizing the same.

2. A method for the manufacture of rubber goods which consists in adding one half to five per cent of parabutyraldehyde to a rubber mix, fabricating an article from said mix, and vulcanizing the same.

3. A method for the manufacture of rubber goods consisting in adding a small quantity of parabutyraldehyde to a rubber mix and fabricating an article from the same.

4. A method for the manufacture of rubber goods consisting in adding one half to five per cent of parabutyraldehyde to a rubber mix and fabricating an article from the same.

5. A method for the manufacture of rubber goods consisting in adding a small quantity of parabutyraldehyde to a rubber solution, fabricating an article from said solution, and vulcanizing the same.

6. A method for the manufacture of rubber goods consisting in adding one half to five per cent of parabutyraldehyde to a rubber solution, fabricating an article from said solution, and vulcanizing the same.

7. A method for the manufacture of rubber goods consisting in adding a small quantity of parabutyraldehyde to a rubber solution and fabricating an article from said solution.

8. A rubber solution for the manufacture of dipped or coated rubber articles comprising a solution of rubber in a suitable solvent and a small quantity of parabutyraldehyde.

9. A rubber solution for the manufacture of dipped or coated rubber articles comprising a solution of rubber in a suitable solvent and from one half to five per cent as much parabutyraldehyde as rubber.

10. A rubber cement comprising a solution of rubber in a suitable solvent and a small quantity of parabutyraldehyde.

Signed by me this 10th day of June, 1924.

BRUCE KEITH BROWN.